July 26, 1949.  C. W. MARKER, JR., ET AL  2,477,135
CUTTER SHARPENING MACHINE
Filed Oct. 22, 1945  2 Sheets-Sheet 1
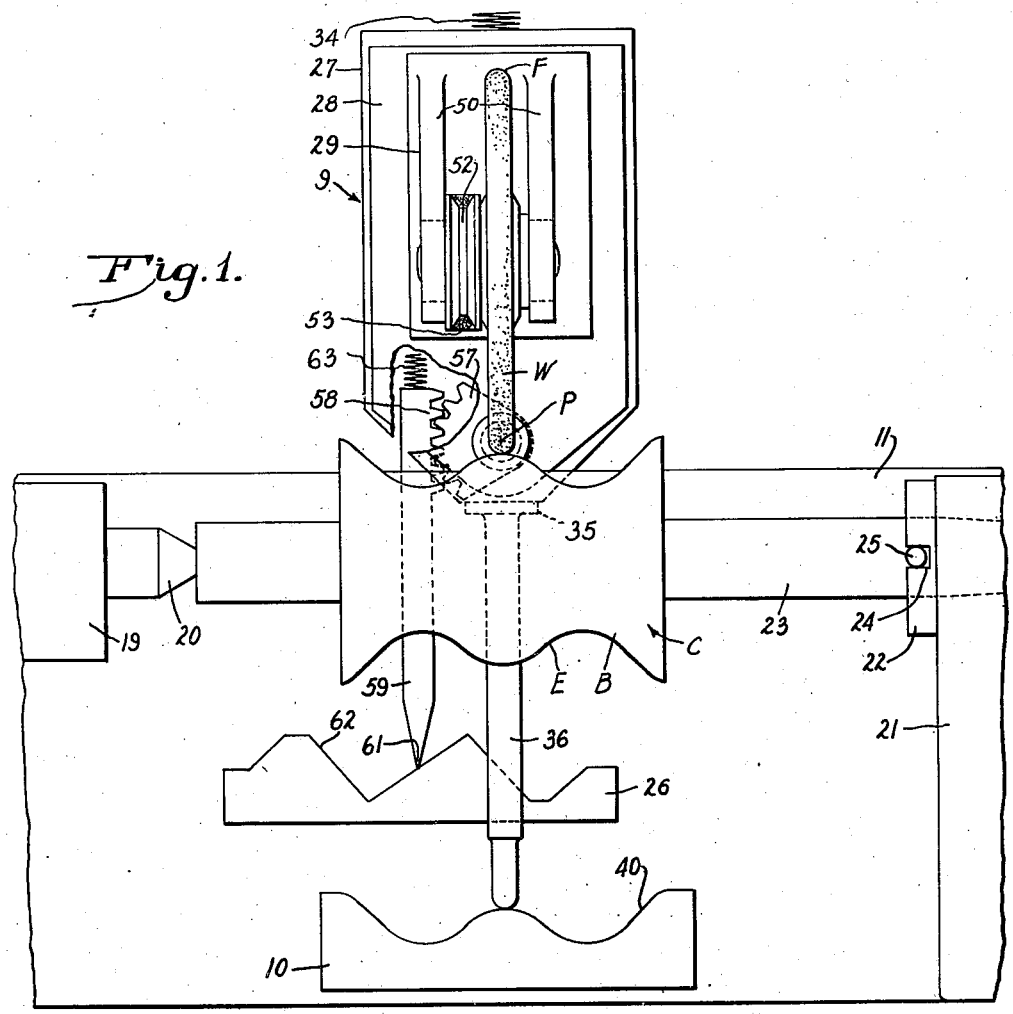
Fig. 1.
Fig. 2.
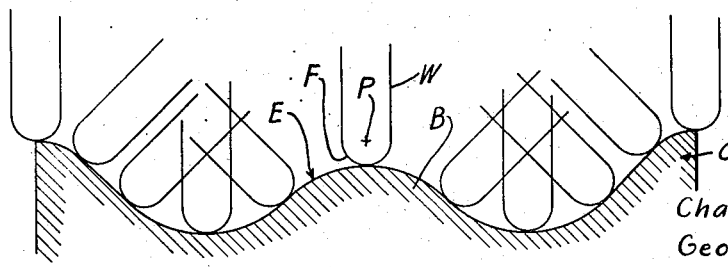
INVENTOR.
Charles W. Marker, Jr.
and
George F. Whitman
BY
Carlson, Pitzner, Hubbard & Wolfe
ATTORNEYS

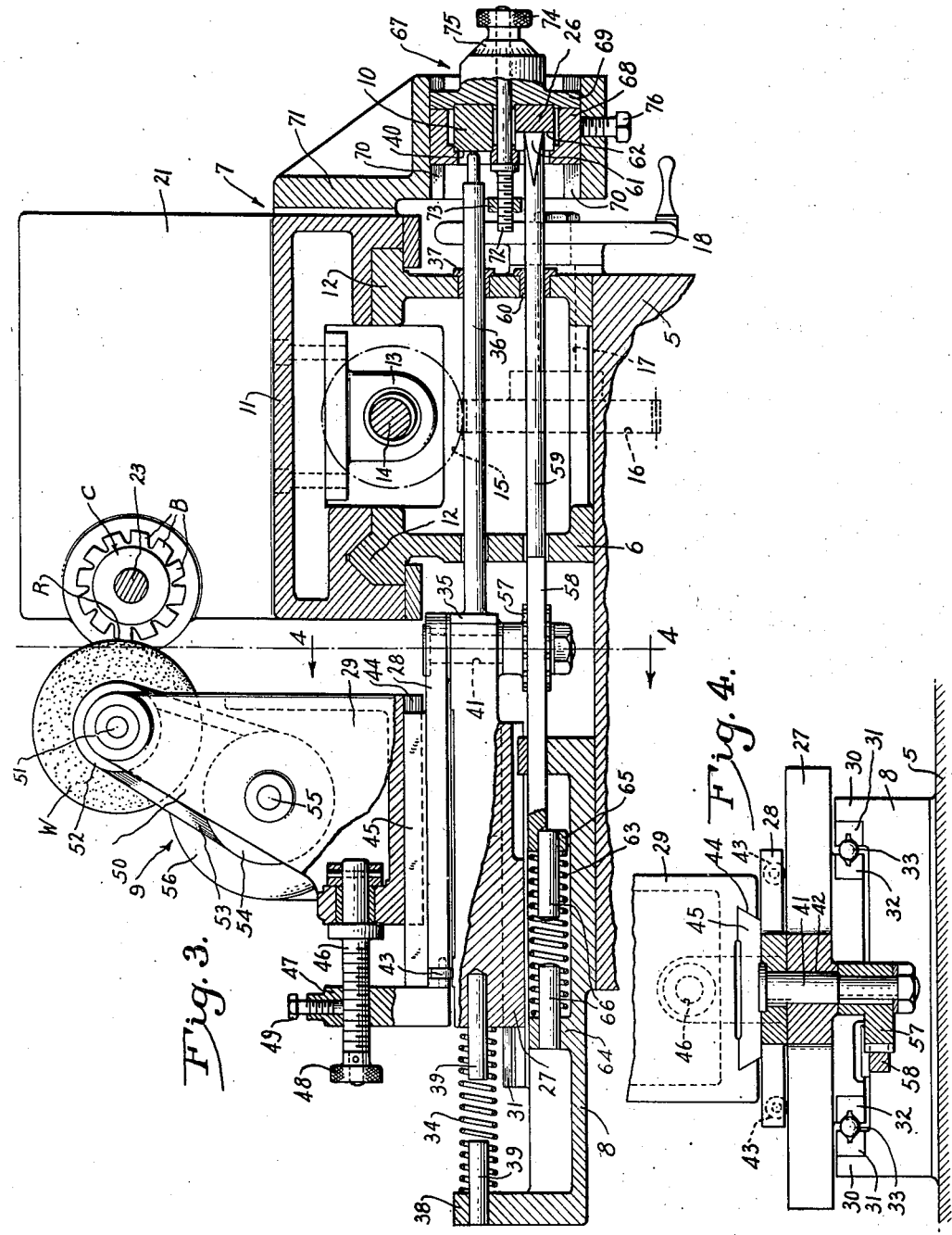

Patented July 26, 1949

2,477,135

UNITED STATES PATENT OFFICE 2,477,135

CUTTER SHARPENING MACHINE

Charles W. Marker, Jr., and George F. Whitman, Rockford, Ill., assignors to Barber-Colman Company, Rockford, Ill., a corporation of Illinois Application October 22, 1945, Serial No. 623,654

13 Claims. (Cl. 51—100)

The present invention relates generally to improvements in cutter sharpening machines, and particularly to a new and improved machine for contour grinding form cutters.

One of the objects of the present invention is to provide a novel cutter sharpening machine which will produce an irregular cutting contour on the work with an adequate clearance angle at all points throughout the length and without regard to the slope of the contour relative to the work axis.

A more specific object is to provide a new and improved machine of the foregoing character in which the grinding wheel, within the practical limits of relative angular disposition of the wheel and the work, is maintained always normal to the work contour at the point of grinding engagement while the wheel and the work are translated relatively axially of the work and positioned relatively transversely of the work in timed relation to the translation to describe a predetermined irregular path of cutting engagement.

Other objects and advantages will become apparent as the description proceeds.

In the accompanying drawings,

Figure 1 is a fragmentary plan view, partially schematic in character, of a cutter sharpening machine embodying the features of the invention.

Fig. 2 is a diagrammatic view on an enlarged scale illustrating the varying angular position of the grinding wheel relative to the work at successive points along the work contour.

Fig. 3 is a fragmentary transverse vertical sectional view through the machine.

Fig. 4 is a sectional detail view taken along line 4—4 of Fig. 3.

Referring more particularly to the drawings, the machine constituting the exemplary embodiment of the invention comprises a main horizontal base 5 provided at the top with a longitudinal sub-base 6 for supporting a work fixture 7, and with a transverse sub-base 8 for supporting a tool fixture 9. The work fixture 7 is adapted to support any desired workpiece, such for example as a rotary form milling cutter C with a plurality of peripherally spaced blades B having an irregular longitudinal cutting edge or contour E. The tool fixture 9 is adapted to be provided with any suitable tool element for sharpening the cutter C, such for example as a rotary grinding wheel W having a peripheral cutting face F rounded in axial section about a center point P.

The work and tool fixtures 7 and 9 are constructed and arranged for relative translation longitudinally of the work axis, and for a correlated relative positioning adjustment transversely of the axis, to describe a resultant path of cutting engagement between the work and the tool corresponding to the contour of the cutting edge E. In the present instance, the workpiece is translated axially through cutting engagement across the rounded face F of the tool, and the latter is shifted transversely of the work axis in timed relation to the translation under the control of a profile cam 10 to produce the desired contour.

In the preferred form, the work fixture 7 comprises a slide or carriage 11 mounted for reciprocation on spaced parallel rectilinear ways 12 formed on the top of the sub-base 6. Any suitable drive may be provided for translating the carriage 11, and in the present instance the drive is shown as comprising a depending nut 13 on the underside of the carriage and in threaded engagement with a lead screw 14 rotatably anchored in the sub-base 6. A spiral gear 15, fixed on the screw 14, meshes with a similar gear 16 on a transverse shaft 17 journaled in and extending to the front of the sub-base 6 and provided with a handwheel 18. It will be evident that rotation of the handwheel 18 in opposite directions will effect forward and reverse reciprocation of the carriage 11 transversely of the face F of the grinding wheel W.

Mounted on opposite ends of the carriage 11 are a tailstock 19 having a dead center 20, and a combination index and lead mechanism 21. The devices 19 and 21 per se form no part of the present invention and, hence, are not disclosed in detail. It is sufficient to state that the index and lead mechanism 21 has a spindle 22 adapted to receive one end of a work arbor 23, and to rotate and locate the latter through a slot 24 and pin 25 connection. The arbor 23, on which the cutter C is adapted to be secured, is engaged at the other end by the center 20. In operation, the index mechanism 21 serves to locate and maintain each selected cutter blade B in correct angular relation to the grinding wheel W during the course of the grinding reciprocation.

The present machine is adapted particularly for grinding the cutting edge E with a clearance or relief R on the back of each blade B as it is presented to the wheel W. Such relief grinding is conveniently obtained by so locating the cutter C and the wheel W in angular and vertical relation to each other that the curved circumference of the wheel will project slightly into the circle of revolution of the cutter starting at and back of the cutting edge E. In instances where the form of the cutter C at any point along the contour is parallel or only slightly inclined to the cutter axis, an adequate cutting clearance is readily obtained. However, when the axis of the wheel W is maintained in fixed angular relation to the work axis, as in the parallel arrangement conventionally employed, the cutting clearance is progressively reduced upon an increase in the angular divergence between the cutting edge E and the wheel axis, and hence will vary along the irregular contour. As an extreme, no cutting clearance will be obtained on any portion of the cutter form that extends perpendicular to the wheel axis. One of the purposes of the present invention, therefore, is to automatically adjust the angular relation between the cutter and wheel axes, within normal or practical limits in accordance with undulations or changes in the form of the cutter C, but without altering the contour, so as to obtain an adequate cutting clearance at all points along each cutting edge. In the present instance, the angular position of the wheel W, in a horizontal plane about the center point P of the rounded grinding face F, is automatically controlled and subject to adjustment by a positioning templet 26 in accordance with the contour of the cutting edge E, so that the wheel is always maintained perpendicular to the contour at each successive point along the edge as it passes through cutting engagement therewith. Different angular positions of the wheel W along the cutter contour are illustrated in Fig. 2. As a result, the angle of relief or clearance in a direction normal to the contour remains constant at all points from end to end. While the diametrical clearance may vary slightly, adequate cutting clearance is always obtained regardless of the steepness of portions of the form or contour.

In the preferred form, the tool fixture 9 comprises an assembly of elements, including a base slide 27 mounted for reciprocation on the sub-base 8 to position the wheel W transversely of the work axis under the control of the templet 10, a pivotal table 28 swiveled on the slide 27 for angular adjustment under the control of the templet 26, and a wheel slide 29 mounted on the table for adjustment in a direction parallel to the movement of the slide, and adapted to support the grinding wheel W for proper cutting depth.

To provide a suitable support for the slide 27, the sub-base 8 is formed at opposite sides with parallel upstanding flanges 30 in which opposed V-guide rails 31 are inserted. Similar rails 32 are inserted in opposite sides of the slide 27, and ball bearings 33 are interposed between the rails 31, 32 of each set to complete the bearing relationship.

The forward end of the base slide 27 is urged by a coiled compression spring 34 into abutting engagement with a head 35 on the rear end of an aligned follower pin 36. This pin extends through and is slidably guided in a bushing 37 in the sub-base 6. At the front of the machine, the pin 36 engages the templet 10, and is reduced in size to a diameter substantially equal to the width of the wheel W and rounded on the same radius as the wheel face F. Preferably, the spring 34 is located in end abutting engagement between the rear end of the base slide 27 and an upstanding end flange 38 on a rearward extension of the sub-base 8, and is seated about two pilot or locating pins 39. It will be evident that the spring 34 acts at all times to maintain the slide 27 against the head 35, and the pin 36 against the face of the templet 10. Since the templet 10 is arranged to control the position of the slide 27 through a direct linear thrust, it is rigidly mounted on the carriage 11 for movement therewith, and is provided with a face 40 having a contour the same in form, length and location relative to the pin 36 as the cutting edge E in relation to the wheel W. Consequently, the templet 10 will position the wheel W correctly in relation to the cutter C at all points in the translation of the carriage 11 to describe the desired resultant path of cut.

The pivotal table 28 is keyed at the forward end to a pin or stub shaft 41 journaled in and extending through a vertical bore 42 in the base slide 27. The bore 42 is so located in the front end of the slide 27 that a projection of its axis will extend through the center point P of the wheel face F when the wheel slide 29 is correctly positioned. Suitable rollers 43 are journaled in the rear end of the table 28 for engagement with the top surface of the slide 27 to support the table for swivel adjustment through the shaft 41.

The wheel slide 29 is provided on its underside with a dovetailed guideway 44 slidably engaging a complemental guide 45 on the table 28 for adjustment in a direction normal to and intersecting the swivel axis of the shaft 41. To facilitate this adjustment, a screw 46 is rotatably anchored to the slide 29 and extends rearwardly therefrom through threaded engagement with a nut 47 on the rear end of the table 28. The adjusting screw 46 is provided with a hand knob 48 whereby it may be rotated, and is adapted to be locked in position of adjustment by a set screw 49.

Formed on the slide 29 are two spaced parallel upstanding bearing arms or brackets 50 between which the grinding wheel W is supported for rotation on an axis perpendicular to the plane of adjustment along the guide 45 and including the swivel axis. In the present instance, the wheel W is fixed on a spindle 51 journaled in the upper ends of the arms 50, and provided with a drive sheave 52. To provide a suitable drive, the sheave 52 is connected through a belt 53 to a pulley 54 on a shaft 55 which is journaled in lower portions of the arms 50, and connected to an electric wheel drive motor 56.

To provide means for swiveling the table 28 and wheel slide 29 as a unit under the control of the templet 26, a gear sector 57 is fixed on the lower end of the shaft 41, and meshes with a gear rack 58 rigid with a follower pin 59 extending through and slidably guided in a bushing 60 in the sub-base 6. The forward end of the pin 59 is formed with a knife edge 61 urged against the face 62 of the templet 26 by a coiled compression spring 63. In the present instance, the spring 63 is disposed between and in abutting engagement at opposite ends against a lug 64 on the sub-base 8 and a lug 65 on the rear end of the gear rack 58. Pins 66 on the lugs 64 and 65 extend into opposite ends of the spring 63 to locate the latter in operative position.

The face 62 of the templet 26 is so shaped and located in relation to the templet 10 that it will, through the pin 59, rack 58, sector 57 and shaft 41, locate the wheel W perpendicular to the contour of the cutter C at all points along the translation of the carriage 11 as illustrated in Fig. 2. Since the adjustment is arcuate, the form or shape of the face 62 is not the same as that of the face 40, but comprises a series of straight line elements.

The control templets 10 and 26 are conveniently mounted in a control housing or box 67 mounted on the carriage 11 at the front of the machine for transverse adjustment as a unit. Thus, the box 67 comprises a channel 68 closed by a cover plate 69 and slidably supported between transverse guides 70 in a depending bracket 71 on the carriage 11. The templets 19 and 26 are removably and adjustably clamped between the parts 68 and 69 and extend longitudinally of the direction of movement. Transverse adjustment of the templet assembly may be effected by a screw 72 which is rotatably journaled in and extends through the box 67, and which is in threaded engagement with a fixed nut 73 on the bracket 71. A hand knob 74 and a micrometer dial 75 are secured to the forward end of the screw 72. It will be understood that upon adjustment of the control box 67, the entire tool fixture 9 will be shifted as a unit to set the wheel W for the proper outside diameter of the work. The box 67 may be secured in position of adjustment by a set screw 76.

In operation, the wheel slide 29 is adjusted to locate the center point P of the wheel face F in line with the swivel axis of the shaft 41. Such adjustment is made as required to compensate for any reduction in diameter of the wheel W, as, for example, by reason of wear, or after each truing of the wheel in a dressing operation. The templet control box 67 is adjusted as required in accordance with the outside diameter of the work. Both templets 19 and 26 are, of course, selected with the required shape to produce the desired contours, and are located longitudinally in correct relation to the work form.

In the actual grinding operation, the cutter C is indexed by the mechanism 21 to locate a blade B in cutting relation to the wheel W, and then is translated in a grinding stroke by the carriage 11 across the grinding face F, and in a return stroke. Means (not shown) may be provided for retracting the wheel W out of contact with the cutter C during the return stroke. If the blades B are straight and parallel to the work axis, the cutter is held against rotation during its reciprocation. If the cutting edges E are helical, the mechanism 21 is utilized to impart a slight rotation to the cutter during each reciprocation to compensate for the lead of the edges. After each selected blade B has been ground, the cutter C is indexed to present another blade to the wheel W until all of the blades have been ground to the desired contour.

During the translation of each blade B across the grinding face F, the templet 26 serves to adjust the wheel W angularly about the shaft 41 so as to maintain it at all times perpendicular to the illustrated cutter form at the point of grinding engagement. The relationship is fully obtainable for any cutter having a contour of such slopes that the wheel need not be swung beyond a practical range of for example 90°. As a result, the cutting edge E is provided with a constant cutting clearance or relief R normal to the contour at all points along the length. The aforesaid angular adjustment does not affect the contour of the work since the swivel axis extends through the center point P of the rounded wheel face F. In all angular positions of the wheel W, the templet 19 serves to position the wheel transversely of the work axis as required to produce the desired contour. Changes in slope of the work contour do not affect the transverse positioning since the templet face 40 has the same contour as the blades B, and the end of the follower pin 36 is rounded in the same manner as the wheel face F.

We claim as our invention:

1. Apparatus for sharpening an elongated cutter tooth to a desired irregular longitudinal cutting contour having, in combination, relatively movable supports, one for said tooth, a rotary abrasive wheel on the other support engageable peripherally with said tooth to form a cutting clearance angle thereon and supported for angular adjustment, pattern controlled mechanism for presenting said wheel to successive longitudinal portions of said tooth and controlling the relative movements between said supports to generate said contour on the tooth, an auxiliary pattern varying in shape according to said contour, and means engaging successive portions of said auxiliary pattern during generation of the corresponding portions of said contour and coacting with the pattern to vary the angular position of said wheel.

2. Apparatus for sharpening an elongated cutter tooth to a desired irregular longitudinal cutting contour having, in combination, relatively movable supports, one for said tooth, a rotary abrasive wheel on the other support engageable with said tooth to form a cutting clearance angle thereon and supported for angular adjustment, pattern controlled mechanism for presenting said wheel to successive longitudinal portions of said tooth and controlling the relative movements between said supports to generate said contour on the tooth, an auxiliary pattern varying in shape according to said contour, and means engaging successive portions of said auxiliary pattern during generation of the corresponding longitudinal portions of said contour and coacting with the pattern to vary the angular position of said wheel whereby to maintain said wheel always normal to the tooth contour within a predetermined angular range.

3. Apparatus for sharpening an elongated cutter tooth to a desired irregular longitudinal cutting contour having, in combination, relatively movable supports, one for said tooth, a rotary abrasive wheel on the other support engageable peripherally with said tooth to form a cutting clearance angle thereon and supported for angular adjustment, pattern controlled mechanism including a templet and for presenting said wheel to successive portions of said tooth and controlling the relative movements between said supports to generate said contour on the tooth, an auxiliary templet varying in shape according to said contour, and means engaging successive portions of said auxiliary templet during generation of the corresponding portions of said contour and coacting with said auxiliary templet to vary the angular position of said wheel, said templets being supported and adjustable as a unit to locate said wheel in cutting relation to said tooth.

4. Apparatus for sharpening an elongated tooth on a cutter to a desired irregular longitudinal contour and with a substantially uniform normal clearance angle, said apparatus having, in combination, a support for said cutter, a rotary abrasive wheel having a convex peripheral surface of arcuate cross section, means supporting said wheel for engagement of said surface with said tooth to form a cutting clearance thereon at a desired relief angle, said cutter support and said wheel supporting means being mounted for relative movement in one direction in a cutting traverse longitudinally of the tooth, for relative movement in a direction transversely of said one direction, and for relative swiveling about an axis coinciding with the center of curvature of said cutting surface, a main pattern corresponding in shape to said contour, means engaging successive portions of said pattern during said longitudinal movement for producing said transverse movement whereby to cause said wheel surface to generate said contour, an auxiliary pattern varying in shape according to said contour, and means engaging successive portions of said auxiliary pattern during said longitudinal movement and coacting with said auxiliary pattern to produce said swiveling motion and maintain a generally constant angular relationship between said wheel surface and said contour.

5. Apparatus for sharpening a cutter tooth to a desired irregular contour having, in combination, relatively movable supports, one for said tooth, a rotary abrasive wheel on the other support having a convex cutting surface of arcuate cross section in an axial plane engageable with said tooth to form a clearance angle thereon and being supported for angular adjustment about an axis passing through the center of the arcuate section of said wheel, pattern controlled mechanism for presenting said wheel to successive portions of said tooth and controlling the relative movements between said tooth and said wheel to generate said contour on the tooth, an auxiliary pattern varying in shape in predetermined relation to said contour, and means engaging successive portions of said auxiliary pattern during generation of the corresponding portions of said contour and coacting with said pattern to vary the angular relationship of said wheel and tooth about said axis.

6. Apparatus for sharpening a cutter tooth to a desired irregular contour having, in combination, relatively movable supports, one for said tooth, a rotary abrasive wheel on the other support having a convex cutting surface of arcuate cross section in an axial plane engageable with said tooth to form a clearance angle thereon and being supported for angular adjustment about an axis passing through the center of the arcuate section of said wheel, pattern controlled mechanism for presenting said wheel to successive portions of said tooth and controlling the relative movements between said tooth and said wheel to generate said contour on the tooth, an auxiliary pattern varying in shape according to said contour, a cooperating rack and gear segment, and means actuating said rack and engaging successive portions of said auxiliary pattern during generation of the corresponding portions of said contour and coacting with said pattern to vary the angular position of said gear segment and with it the angular relationship between said wheel and the tooth contour.

7. Apparatus for sharpening a cutter tooth to a desired irregular contour comprising, in combination, a base, supports relatively movable on said base, one of said supports carrying the cutter tooth, a rotary abrasive wheel on the other support having a convex cutting surface of arcuate cross section engageable with said tooth to form a clearance angle thereon, a pattern controlled mechanism for effecting engagement of said wheel with successive portions of said tooth and controlling relative movements between said wheel and tooth to generate said contour on the tooth, an auxiliary pattern varying in shape in predetermined relation to said contour, and means engaging successive portions of said auxiliary pattern during generation of the corresponding portions of said contour, said means coacting with said auxiliary pattern to vary the angular relationship of said wheel and tooth about an axis perpendicular to the base and passing through the center of the arcuate section of said wheel, and the shape of said auxiliary pattern being such that the central plane of the wheel is kept approximately normal to the contour of the tooth at the point of engagement between the tooth and wheel.

8. Apparatus for shaping an elongated tooth on a cutter to a desired irregular longitudinal contour and with an adequate clearance angle along the entire irregular contour, said apparatus having, in combination, a support for said cutter, a rotary abrasive wheel having a convex peripheral surface of arcuate cross section, means supporting said wheel for engagement of said surface with said tooth to form a desired clearance angle thereon, said support and supporting means being mounted for relative movement longitudinally of the tooth, for transverse relative movement, and for relative swiveling about an axis coinciding with the center of curvature of said arcuate cross sectional surface, a main pattern corresponding in shape to said contour, means engaging successive portions of said pattern during said longitudinal movement for producing said transverse movement whereby to cause said wheel surface to generate said contour on said tooth, an auxiliary pattern varying in shape according to said contour, coacting linearly movable and rotatably supported members, and means comprising said linearly movable member engaging successive portions of said auxiliary pattern during said longitudinal movement and coacting with said pattern to actuate said rotatably supported member and thereby to produce said swiveling motion and maintain a generally constant angular relationship between said wheel surface and said contour.

9. In apparatus of the character described for sharpening an elongated cutter tooth to a desired irregular longitudinal contour, the combination of relatively movable supports, one for said tooth, a rotary abrasive wheel on the other support having a convex cutting surface of arcuate cross section engageable with said tooth to form a clearance angle thereon, a pattern controlled mechanism including a pattern having the desired contour of the cutter tooth and a pattern follower for presenting said wheel to successive longitudinal portions of said tooth and controlling the relative movements between said tooth and said wheel to generate said contour on the tooth, said pattern follower having an arcuate active surface, an auxiliary pattern varying in shape in relation to said contour, and a second follower engaging successive portions of said auxiliary pattern during generation of corresponding longitudinal portions of said contour and coacting with said auxiliary pattern to vary the angular relationship between said wheel and the tooth contour.

10. In apparatus of the character described for sharpening an elongated cutter tooth to a desired irregular longitudinal contour, the combination of relatively movable supports, one for said tooth, a rotary abrasive wheel on the other support having a convex cutting surface of arcuate cross section engageable with said tooth to form a clearance angle thereon, a pattern controlled mechanism including a pattern having the desired contour of the cutter tooth and a pattern follower for presenting said wheel to successive longitudinal portions of said tooth and controlling the relative movements between said supports to generate said contour on the tooth, said pattern follower having an arcuate active surface, an auxiliary pattern varying in shape in relation to said contour, and a second follower having a sharp contact surface engaging successive portions of said auxiliary pattern during generation of corresponding longitudinal portions of said contour and coacting with said auxiliary pattern to vary the angular relationship between said wheel and the tooth contour.

11. In apparatus for sharpening a cutter tooth having a desired irregular contour, the combination of a base, a rotary abrasive wheel having a convex peripheral surface of arcuate cross section, means supporting said wheel for swiveling movement with respect to said base about an axis perpendicular to the base passing through the center of said arcuate section of the wheel, a templet relatively movable with respect to said wheel and having a surface contour related to the irregular contour of said cutter, means for relatively moving said templet with respect to said wheel, coacting actuating and driven elements, said driven element being drivingly connected to said supporting means to determine the position of the supporting means about said axis, and said actuating element coacting with successive portions of said templet during relative movement of the wheel and templet to control the position of said driven element.

12. In apparatus for sharpening a cutter tooth having a desired irregular contour, the combination of a rotary abrasive wheel having a convex peripheral surface of arcuate cross section, support means for said wheel mounted for swiveling movement about an axis coinciding with the center of curvature of said arcuate cross sectional surface of the wheel, a pattern varying in shape in relation to the irregular cutter contour and relatively movable with respect to the wheel, means for relatively moving said pattern with respect to said wheel, and means controlling the angular position of said wheel about said axis during relative movement between the wheel and pattern, said means comprising pattern tracing means including a rack and a cooperating gear segment secured to said support means in concentric relation with respect to said axis.

13. In apparatus for sharpening a cutter tooth having a desired irregular elongated contour, the combination of a rotary abrasive wheel, a support for the tooth, support means for said wheel mounted for swiveling movement, means for effecting relative translation between said support and support means to traverse said wheel along said contour, a pattern varying in shape in relation to the angular disposition of successive points along the irregular contour of said cutter tooth and movable relative to the wheel, and means adapted to follow said pattern during relative movement between the pattern and wheel to control the angular disposition of said wheel with respect to said irregular contour, the relation of the shape of said pattern to said irregular contour being such that the plane of said wheel in the course of said traverse is kept practically normal to the irregular contour at all points of engagement between the wheel and cutter tooth.

CHARLES W. MARKER, Jr.
GEORGE F. WHITMAN.

REFERENCES CITED

The following references are of record in the file of this patent:

UNITED STATES PATENTS

| Number | Name | Date |
| --- | --- | --- |
| 1,186,616 | Strecker | June 13, 1916 |
| 1,417,364 | Wallace | May 23, 1922 |
| 1,689,135 | Hanson | Oct. 23, 1928 |
| 1,759,196 | Jackson | May 20, 1930 |
| 2,124,093 | Wells | July 19, 1938 |
| 2,130,575 | Adams | Sept. 20, 1938 |
| 2,363,482 | Clark | Nov. 28, 1944 |